US009063290B2

(12) United States Patent
Takeuchi et al.

(10) Patent No.: US 9,063,290 B2
(45) Date of Patent: *Jun. 23, 2015

(54) SUBJECT TRACKING APPARATUS, CAMERA HAVING THE SUBJECT TRACKING APPARATUS, AND METHOD FOR TRACKING SUBJECT

(75) Inventors: Hiroshi Takeuchi, Tokyo (JP); Keiko Muramatsu, Tachikawa (JP)

(73) Assignee: NIKON CORPORATION, Tokyo (JP)

( * ) Notice: Subject to any disclaimer, the term of this patent is extended or adjusted under 35 U.S.C. 154(b) by 337 days.

This patent is subject to a terminal disclaimer.

(21) Appl. No.: 13/547,053

(22) Filed: Jul. 12, 2012

(65) Prior Publication Data
US 2012/0274785 A1 Nov. 1, 2012

Related U.S. Application Data

(63) Continuation of application No. 12/281,080, filed as application No. PCT/JP2007/061013 on May 30, 2007, now Pat. No. 8,253,800.

(30) Foreign Application Priority Data

Jun. 28, 2006 (JP) .................................. 2006-178175
Aug. 16, 2006 (JP) .................................. 2006-221811

(51) Int. Cl.
*H04N 5/225* (2006.01)
*G02B 7/28* (2006.01)
(Continued)

(52) U.S. Cl.
CPC ................. *G02B 7/28* (2013.01); *G01S 3/7864* (2013.01); *G03B 13/36* (2013.01); *H04N 5/23212* (2013.01); *H04N 5/2351* (2013.01); *H04N 5/2353* (2013.01); *H04N 9/045* (2013.01)

(58) Field of Classification Search
USPC .................................. 348/169, 345; 382/103
See application file for complete search history.

(56) References Cited

U.S. PATENT DOCUMENTS

| | | | |
|---|---|---|---|
| 4,792,820 A | 12/1988 | Norita et al. | |
| 4,974,005 A | 11/1990 | Izumi et al. | |

(Continued)

FOREIGN PATENT DOCUMENTS

| | | |
|---|---|---|
| JP | 04-293368 | 10/1992 |
| JP | 06-165016 | 6/1994 |

(Continued)

OTHER PUBLICATIONS

Japanese Office Action for corresponding JP Application No. 2006-221811, Dec. 21, 2010.

(Continued)

*Primary Examiner* — Philip B Tran
(74) *Attorney, Agent, or Firm* — Mori & Ward, LLP

(57) ABSTRACT

A subject tracking apparatus includes a light detector, a focus detector, and a tracking controller. The focus detector is configured to detect focus information at a plurality of focus detection regions in a view of an image. The focus information includes at least focus information detected at a subject region of a subject in the view. The tracking controller is configured to determine at least one first region having substantially same light information as light information detected at the subject region from among a plurality of light measurement regions, to determine at least one second region having substantially same focus information as the focus information detected at the subject region from among the plurality of focus detection regions, and to determine reference information for tracking the subject in the view based on the at least one first region and the at least one second region.

25 Claims, 12 Drawing Sheets

(51) Int. Cl.
- *G01S 3/786* (2006.01)
- *G03B 13/36* (2006.01)
- *H04N 5/232* (2006.01)
- *H04N 5/235* (2006.01)
- *H04N 9/04* (2006.01)

(56) References Cited

U.S. PATENT DOCUMENTS

| | | |
|---|---|---|
| 5,053,801 A | 10/1991 | Ishida et al. |
| 5,235,376 A | 8/1993 | Inoue et al. |
| 5,255,045 A | 10/1993 | Nonaka |
| 5,418,595 A | 5/1995 | Iwasaki et al. |
| 6,067,114 A | 5/2000 | Omata et al. |
| 7,079,188 B2 | 7/2006 | Shiraishi et al. |
| 7,136,581 B2 | 11/2006 | Fujii |
| 8,253,800 B2 * | 8/2012 | Takeuchi et al. .............. 348/169 |
| 2003/0164892 A1 | 9/2003 | Shiraishi et al. |
| 2003/0179310 A1 | 9/2003 | Irie |
| 2005/0264679 A1 | 12/2005 | Sasaki et al. |
| 2007/0058046 A1 | 3/2007 | Kagei |

FOREIGN PATENT DOCUMENTS

| | | |
|---|---|---|
| JP | 06-233168 | 8/1994 |
| JP | 6-230453 | 9/1994 |
| JP | 06-245132 | 9/1994 |
| JP | 7-110429 | 4/1995 |
| JP | 9-243904 | 9/1997 |
| JP | 2001-116985 | 4/2001 |
| JP | 2003-015019 | 1/2003 |
| JP | 2004-294621 | 10/2004 |
| JP | 2005-055744 | 3/2005 |
| JP | 2005-064749 | 3/2005 |
| JP | 2005-215373 | 8/2005 |
| JP | 2006-058431 | 3/2006 |
| JP | 2007-081754 | 3/2007 |

OTHER PUBLICATIONS

Japanese Office Action for corresponding JP Application No. 2006-178175, Mar. 29, 2011.

* cited by examiner

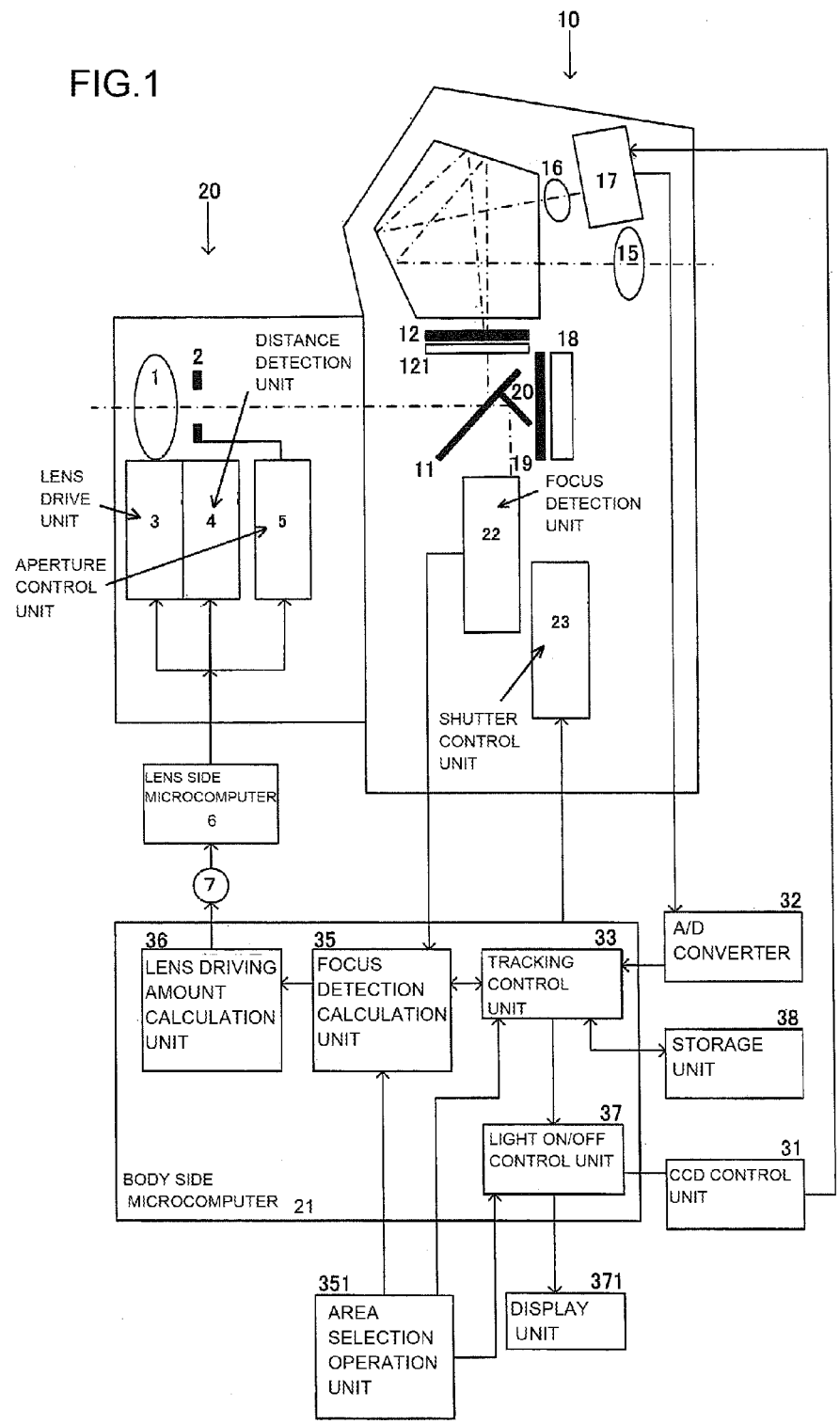

FIG. 2A
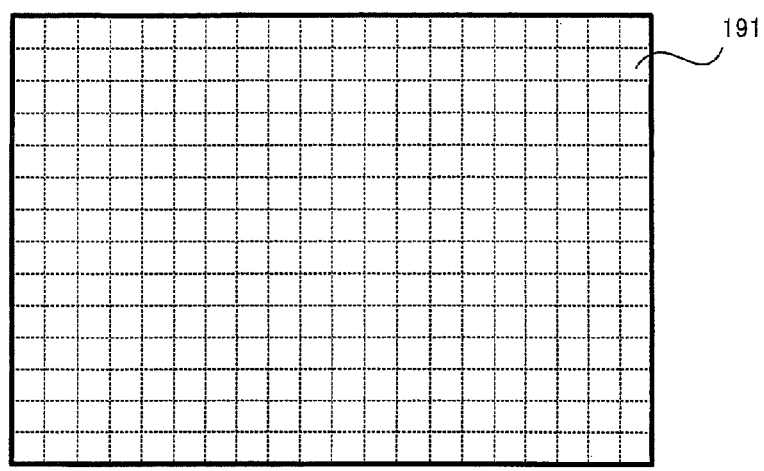
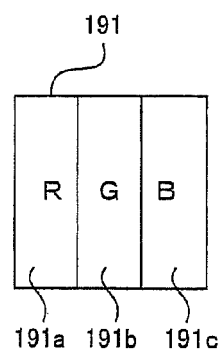
FIG. 2B

FIG. 10A
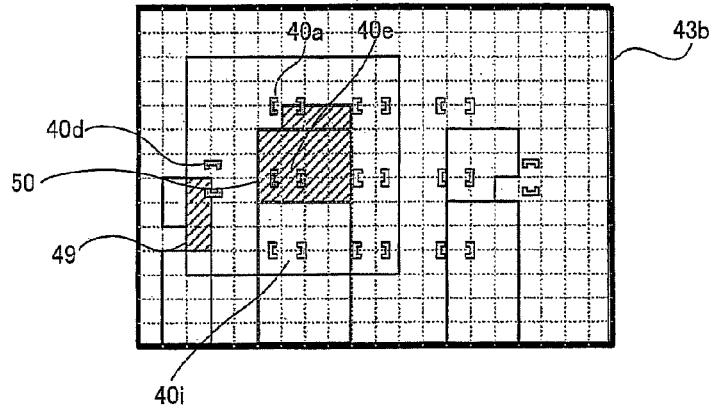
FIG. 10B   FIG. 10C
48a  48b
FIG. 10D
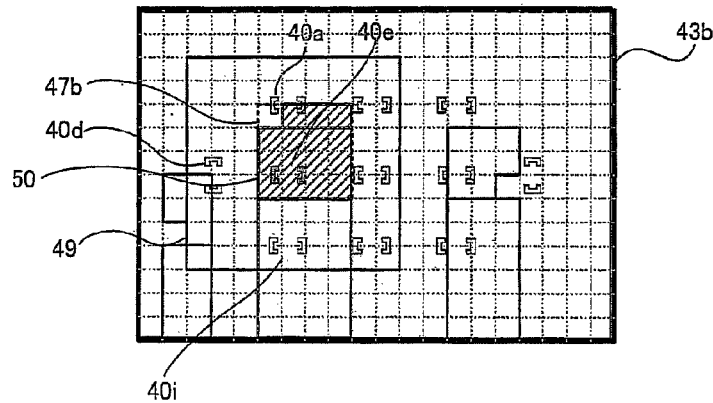
FIG. 10E
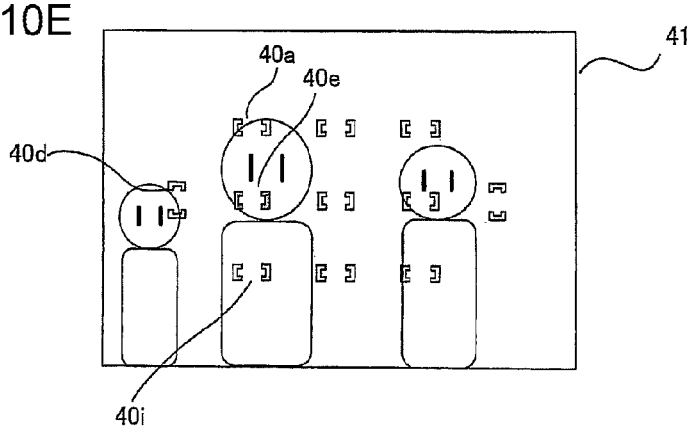

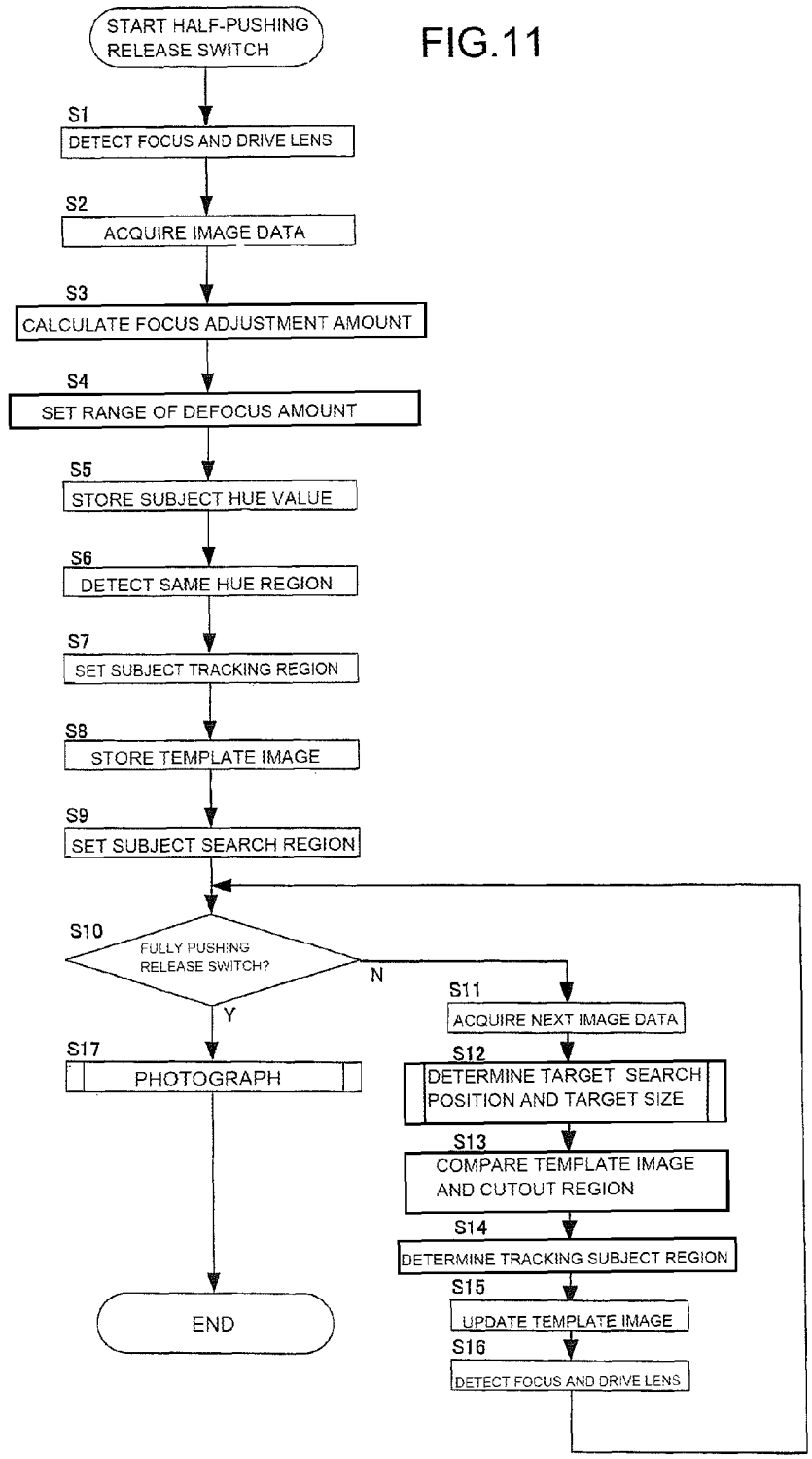

SUBJECT TRACKING APPARATUS, CAMERA HAVING THE SUBJECT TRACKING APPARATUS, AND METHOD FOR TRACKING SUBJECT

CROSS-REFERENCE TO RELATED APPLICATIONS

The present application is a continuation application of the U.S. patent application Ser. No. 12/281,080 filed Aug. 28, 2008, which in turn is a national stage application of International Application No. PCT/JP2007/061013, filed May 30, 2007, which claims priority to Japanese Patent Application Nos. 2006-178175 and 2006-221811, filed on Jun. 28, 2006 and Aug. 16, 2006. The contents of these applications are incorporated herein by reference in their entirety.

BACKGROUND OF THE INVENTION

1. Field of the Invention

The present invention relates to a subject tracking apparatus, a camera having the subject tracking apparatus, and a method for tracking a subject.

2. Discussion of the Background

Conventionally, detecting the movement of a subject based on light measurement information for every divided region of a field divided into plurals, and tracking a region focused by manual operation while tracking the subject as a new subject are known (see e.g., Japanese Unexamined Patent Publication No. 06-230453).

A camera which automatically tracks the subject when photographing a moving subject, and performs focus detection and exposure calculation is known. In the conventional camera, an image that becomes a reference for tracking the subject is stored, and a target of high correlation is tracked by pattern matching (see e.g., Japanese Unexamined Patent Publication No. 2006-58431).

SUMMARY OF THE INVENTION

According to one aspect of the present invention, a subject tracking apparatus includes a light detector, a focus detector, and a tracking controller. The light detector is configured to detect light information based on light from a subject to be tracked at a plurality of light measurement regions in a view of an image. The light information includes at least light information detected at a subject region of the subject in the view. The focus detector is configured to detect focus information at a plurality of focus detection regions in the view. The focus information includes at least focus information detected at the subject region of the subject in the view. The tracking controller is configured to determine at least one first region having substantially same light information as the light information detected at the subject region from among the plurality of light measurement regions, to determine at least one second region having substantially same focus information as the focus information detected at the subject region from among the plurality of focus detection regions, and to determine reference information for tracking the subject based on the at least one first region and the at least one second region.

According to another aspect of the present invention, a camera for picking up an image through an optical system includes a subject tracking apparatus. The subject tracking apparatus includes a light detector, a focus detector, and a tracking controller. The light detector is configured to detect light information based on light from a subject to be tracked at a plurality of light measurement regions in a view of an image. The light information includes at least light information detected at a subject region of the subject in the view. The focus detector is configured to detect focus information at a plurality of focus detection regions in the view. The focus information includes at least focus information detected at the subject region of the subject in the view. The tracking controller is configured to determine at least one first region having substantially same light information as the light information detected at the subject region from among the plurality of light measurement regions, to determine at least one second region having substantially same focus information as the focus information detected at the subject region from among the plurality of focus detection regions, to determine reference information for tracking the subject in the view based on the at least one first region and the at least one second region, and to track the subject in the view based on the tracking information.

According to further aspect of the present invention, a method for tracking a subject includes detecting light information based on light from a subject to be tracked at a plurality of light measurement regions in a view of an image provide by an optical system, the light information including at least light information detected at a subject region of the subject in the view; detecting focus information at a plurality of focus detection regions in the view, the focus information including at least focus information detected at the subject region of the subject in the view; determining at least one first region having substantially same light information as the light information detected at the subject region from among the plurality of light measurement regions; determining at least one second region having substantially same focus information as the focus information of the subject from among the plurality of focus detection regions; determining reference information for tracking the subject in the view based on the at least one first region and the at least one second region; and tracking the subject in the view based on the reference information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a view describing the main configuration of a single-lens reflex electronic camera of an embodiment.

FIGS. 2A and 2B are views describing a pixel configuration of an imaging element of a light measurement image sensor.

FIG. 3 is a view showing a light measurement range of the light measurement image sensor of a first embodiment.

FIG. 5 is a view describing a range of storing as a template of the first embodiment.

FIGS. 10A to 10E are views describing a tracking method of the second embodiment.

FIG. 11 is a flowchart describing the operation of a subject tracking process of the second embodiment.

DESCRIPTION OF THE EMBODIMENTS

Figure 4:
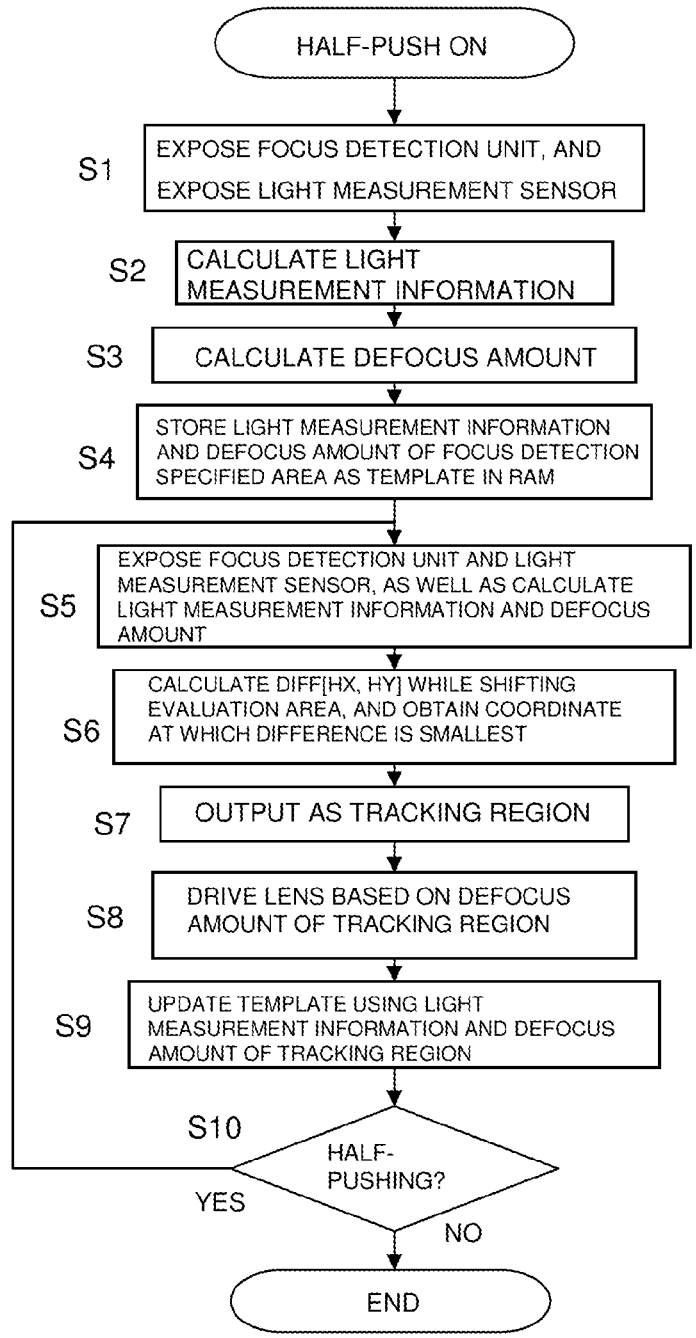
FIG. 4 is a flowchart describing a tracking process performed by a body side microcomputer of the first embodiment.

The embodiments will now be described with reference to the accompanying drawings, wherein like reference numerals designate corresponding or identical elements throughout the various drawings.

First Embodiment

FIG. 1 is a view describing the main configuration of a single-lens reflex electronic camera according to a first embodiment. In FIG. 1, an interchangeable lens 20 configured to be removable with respect to a camera body 10 is attached to the camera body 10.

The camera body 10 includes a body side microcomputer 21, a focus detection unit (or focus detection means) 22, a shutter control unit 23, a quick return mirror 11, a focus plate 12, a roof prism 13, an eyepiece 15, a lens 16, a light measurement unit (or light detection means) 17, an imaging element 18, a shutter 19, a liquid crystal display plate 121, a CCD control unit 31, an A/D converter 32, a tracking control unit (or tracking control means) 33, a focus detection calculation unit 35, an area selection operation unit 351, a lens driving amount calculation unit 36, a light on/off control unit 37, and a display unit 371. The body side microcomputer 21, the CCD control unit 31, the A/D converter 32, a storage unit 38, the area selection operation unit 351, and the display unit 371 are drawn outside the camera body 10 in FIG. 1, but are arranged inside the camera body 10 in the actual configuration.

The interchangeable lens 20 includes a photographing lens 1, an aperture 2, a lens drive unit 3, a distance detection unit 4, an aperture control unit 5, and a lens side microcomputer 6. The lens side microcomputer 6 is drawn outside the interchangeable lens 20 in FIG. 1, but is arranged inside the interchangeable lens 20 in the actual configuration. When the interchangeable lens 20 is attached to the camera body 10, the lens side microcomputer 6 and the body side microcomputer 21 are connected through an electoral contacting point 7.

The body side microcomputer 21 performs a well-known exposure calculation, a well-known automatic focus (AF) calculation, and the like when the release switch (not shown) is half-push operated, and starts the photograph control when the release switch (not shown) is full-push operated. The body side microcomputer 21 also communicates with the lens side microcomputer 6. The content transmitted by the body side microcomputer 21 to the lens side microcomputer 6 includes movement amount, movement direction of the focus adjustment optical system calculated by AF calculation, narrowing amount of the aperture 2 calculated in the exposure calculation, and the like. The focus adjustment optical system is a focus adjustment lens included in the photographing lens 1.

The lens side microcomputer 6 performs communication with the body side microcomputer 21, drive control of the focus adjustment optical system, narrowing control of the aperture 2, and the like. The movement of the focus adjustment optical system includes sending an instruction to the lens drive unit 3 and moving the focus adjustment optical system forward and backward in an optical axis direction according to the data (lens driving amount) transmitted from the lens driving amount calculation unit 36 of the body side microcomputer 21. The narrowing of the aperture 2 includes sending an instruction to the aperture control unit 5, and narrowing the aperture 2 according to the data transmitted from the body side microcomputer 21. The distance detection unit 4 detects a signal indicating the movement distance of the focus adjustment optical system using a detection signal by a detecting device (not shown). When the focus adjustment optical system is moved to a focused position, a sharp image of the main subject is focused on the imaging element 18 and the light measurement unit 7 of the camera body 10 side.

The subject light entered to the camera body 10 through the photographing lens 1 and the aperture 2 is guided upward by the quick return mirror 11 at an illustrated position before the full-push operation of the release switch, and focused on the focus plate 12. The subject light is further entered to the roof prism 13. The roof prism 13 guides the incident subject light to the eyepiece 15 and also guides one part thereof to the lens 16. The light entered to the lens 16 enters the light measurement unit 17 and focuses a subject image on a sensor.

The light measurement unit 17 includes a light measurement image sensor (CCD or CMOS sensor) including a plurality of photoelectric conversion elements corresponding to pixels. FIG. 2A is a view describing a pixel configuration of a light measurement image sensor. As shown in FIG. 2A, the light measurement image sensor includes a plurality of (20× 14 in the illustrated example) pixels 191 arrayed in a matrix form. Each pixel 191 is further divided into three thin pixels 191a to 191c, as shown in FIG. 2B. Each thin pixel 191a to 191c is arranged with a three primary color filters of R (red), G (green), and B (blue) to obtain an RGB output of the subject image.

The light measurement unit 17 accumulates signal charges corresponding to the subject image focused on the light measurement image sensor and sweeping of accumulated charges by the CCD control unit 31. The A/D conversion circuit 32 converts an analog imaging signal output from the light measurement unit 17 to a digital image signal, and outputs the digital signal to the tracking control unit 33 of the body side microcomputer 21. The body side microcomputer includes CPU, ROM, RAM, and various peripheral circuits. The tracking control unit 33 performs tracking of a tracking target based on the digital image signal of the image data acquired in the light measurement unit 17. The body side microcomputer 21 performs a predetermined exposure calculation based on the photoelectric conversion signal output from the light measurement image sensor, and determines a control aperture value and an exposure shutter speed.

Furthermore, one part of the subject is transmitted through the quick return mirror 11 and guided to the focus detection unit 22 at a lower side of a sub-mirror 20. The focus detection unit 22 includes an image sensor (CCD or CMOS sensor) for defocus amount detector through a phase difference detection method. The defocus amount detection image sensor images the subject image focused on the sensor, and outputs the photoelectric conversion signal corresponding to the brightness of the subject image to the focus detection calculation unit 35 of the body side microcomputer 21. The focus detection calculation unit 35 of the body side microcomputer 21 performs the AF calculation based on the photoelectric conversion signal output from the focus detection unit 22, and calculates the defocus amount.

The body side microcomputer 21 performs tracking of the tracking target based on the tracking result of the tracking control unit 33 and the detection result of the focus detection calculation unit 35. The body side microcomputer 21 outputs a tracking subjection region that becomes the tracking target to the focus detection calculation unit 35. The focus detection calculation unit 35 calculates the defocus amount of a focus detection region 40 (to be hereinafter described) corresponding to the focus detection region closest to the middle of the tracking subject region, and outputs the calculation result to the lens driving amount calculation unit 36.

The light on/off control unit 37 outputs the focus detection region 40 closest to the tracking subject region to the display unit 371. The display units 371 performs light-on/light-off (light on/off) of the AF area mark representing the focus detection region 40 output from the light on/off control unit 37. The display unit 371 can display the AF area mark by a liquid crystal display plate 121 arranged at a vicinity of the focus plate 12.

Specifically, the calculation of the defocus amount obtains the relative position shift amount (relative interval) of the image by a pair of defocus amount detection light fluxes entered through different regions of the photographing lens 1. The images by the pair of defocus amount detection light fluxes are two images imaged at different positions on the defocus amount detection image sensor. The pair of images move close to each other in a so-called pre-pin state in which the photographing lens 1 focuses a sharp image of the subject before the scheduled focus plane, and move away from each other in a so-called post-pin state in which the sharp image of the subject is focused behind the scheduled focus plane. The pair of images relatively match in a focused state in which the sharp image of the subject is focused on the scheduled focus plane. Therefore, the focus detection calculation unit 35 obtains the focus adjustment state, that is, the defocus amount of the photographing lens 1 by obtaining the relative position shift amount of the pair of images. The lens driving amount calculation unit 36 of the body side microcomputer 21 determines the forward/backward movement amount and the movement direction of the focus adjustment optical system according to the defocus amount, and transmits the necessary data (lens driving amount in the present embodiment) to the lens side microcomputer 6.

After the full-push operation of the release switch, the quick return mirror 11 turns to outside the optical path. The subject light is guided to the imaging element 18 for photographing through the shutter 19, and focuses the subject image on the imaging plane. The imaging element is configured by a photographing image sensor (CCD or CMOS sensor) with a plurality of photoelectric conversion elements corresponding to pixels. the imaging element 18 images the subject image focused on the imaging plane and outputs the photoelectric conversion signal corresponding to the brightness of the subject image.

(Light Measurement Information)

The light measurement image sensor (light measurement unit 17) described above has color filters of R (red), G (green), and B (blue) arranged corresponding to the pixel positions on the imaging plane, similar to the imaging element for photographing (see FIG. 2A and FIG. 2B). Since the image sensor images the subject image through the color filter, the photoelectric conversion signal output from the light measurement image sensor contains color information of one of the RGB color system.

Figure 3:
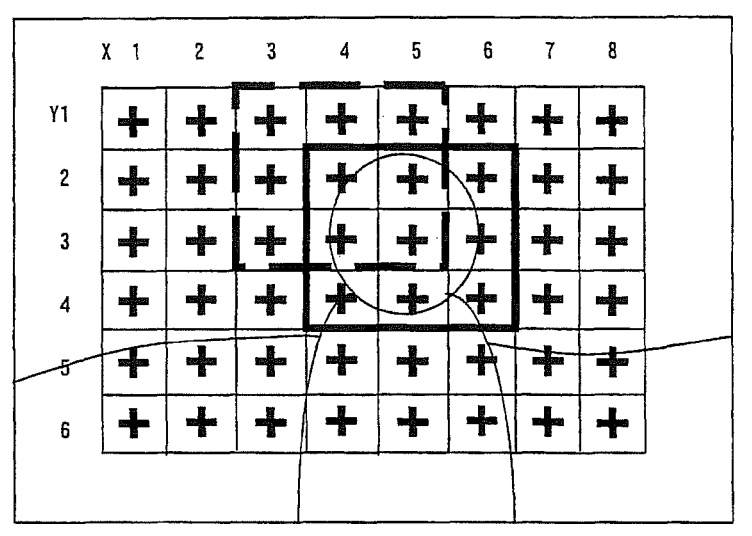

The body side microcomputer 21 groups the pixels of the light measurement image sensor (light measurement unit 17) for every predetermined region, and handles the photoelectric conversion signal from each region in block units. FIG. 3 is a view showing a light measurement range of the light measurement image sensor (light measurement unit 17). In the present embodiment, the light measurement range is divided into a total of forty-eight regions of eight blocks in the horizontal direction (X direction) and six blocks in the vertical direction (Y direction). The body side microcomputer adds the R component signal, the G component signal, and the B component signal contained in the region for each divided region, and assumes the addition result as the light measurement information in the relevant region. The light measurement information of the R component is expressed as R[X,Y], the light measurement information of the G component is expressed as G[X,Y], and the light measurement information of the B component is expressed as B[X, Y]. Here, X=1 to 8 and Y=1 to 6.

(Focus Detection Information)

The photoelectric conversion signal from the defocus amount detection image sensor (focus detection unit 22) has tone information for every pixel corresponding to the brightness of the subject image. The focus detection calculation unit 35 groups the pixels of the defocus amount detection image sensor (focus detection unit 22) for every predetermined region, and performs the defocus amount deriving calculation for every block using the photoelectric conversion signal from each region. In the present embodiment, the divided region used in the defocus amount detection is matched with the divided region of the light measurement image sensor (light measurement unit 17) shown in FIG. 3.

The cross line shown in each divided region of FIG. 3 shows the pixel order on the defocus amount detection image sensor (focus detection unit 22) which outputs the photoelectric conversion signal used in defocus amount calculation. The focus detection calculation unit 35 of the body side microcomputer 21 calculates the defocus amount using the photoelectric conversion signal from the pixels lined in a cross-shape for each divided region, and assumes the calculation result as the focus detection information in the relevant region. The focus detection information is expressed as D[X, Y], where X=1 to 8, and Y=1 to 6.

(Tracking Process)

The process of tracking the main subject performed in the body side microcomputer 21 will be described with reference to the flowchart of FIG. 4. The program of performing the process of FIG. 4 is stored in the memory (not shown) in the body side microcomputer 21, and is activated when the half-push ON signal (half-push operation signal) from the release switch (not shown) is input to the body side microcomputer 21.

In step S1, the body side microcomputer 21 instructs the focus detection unit 22 of the exposure to the defocus amount detection image sensor, instructs the light measurement unit 17 of the exposure to the light measurement image sensor, and proceeds to step S2. The analog imaged signal form the light measurement image sensor is converted to a digital image signal in the A/D conversion circuit 32, and output to the tracking control unit 33. In step S2, the tracking control unit 33 of the body side microcomputer 21 calculates the light measurement information, and proceeds to step S3.

The light measurement information is calculated in the following manner. The tracking control unit 33 of the body side microcomputer 21 calculates the color information RG[X,Y] and BG[X,Y] from the following equations (1) and (2) using the light measurement information R[X, Y], G[X, Y], and B[X, Y] of each color component described above, $$RG[X,Y]=\log_2(R[X,Y])-\log_2(G[X,Y]) \quad (1)$$

$$BG[X,Y]=\log_2(B[X,Y])-\log_2(G[X,Y]) \quad (2)$$

where X=1 to 8 and Y=1 to 6

The tracking control unit 33 of the body side microcomputer 21 also calculates the luminance information L[X, Y] from the following equation (3), $$L[X,Y]=\log_2(Kr \times R[X,Y]+Kg \times G[X,Y]+Kb \times B[X,Y])-\log_2(T)-\log_2(G) \quad (3)$$

where T is the exposure time of the light measurement image sensor, G is the gain, and Kr, Kg, Kb are respectively the color composition coefficient of each color of RGB.

In step S3 of FIG. 4, the focus detection calculation unit 35 of the body side microcomputer 21 calculates the defocus amount D[X, Y] in the divided region and proceeds to step S4. Here, X=1 to 8 and Y=1 to 6.

In step S4, the storage unit 38 of the body side microcomputer 21 stores, as templates, the defocus amount calculated for the specified focus detection area (one of the regions of the divided region shown in FIG. 3) and the neighboring region of the relevant specified area (nine adjacent regions with the specified area as the center in the present embodiment), and the light measurement information (color information and luminance information) calculated in the nine light measurement regions corresponding to the focus detection areas of the relevant nine regions, and proceeds to step S5. The specification of the focus detection area is performed by the operation signal from the area selection operation unit 351 in advance.

Figure 5:
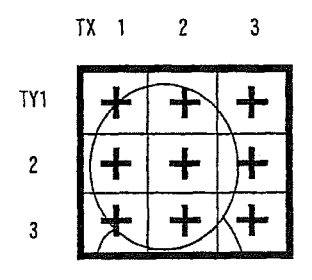

FIG. 5 is a view describing the range of storing as a template. In the present embodiment, information on a total of nine regions, three blocks in the horizontal direction (X direction) and three blocks in the vertical direction (Y direction) are stored. The middle of the nine regions corresponds to the region specified as the focus detection area, and corresponds to the region of X=5, Y=3 of the light measurement range of FIG. 3 in the example of FIG. 5. Information on the range of X=4 to 6, Y=2 to 4 having the region X=5, Y=3 as the center is stored in the template in this case. The stored information represents the color information TRG[TX, TY] and TBG[TX, TY], luminance information TL[TX, TY] and defocus amount TD[TX, TY], where TX=1 to 3, TY=1 to 3.

In step S5 of FIG. 4, the body side microcomputer 21 instructs the next exposure to the focus detection unit 22 and the light measurement unit 17. The body side microcomputer 21 further performs the calculation of the light measurement information similar to step S2 and the calculation of the defocus amount similar to step S3, and proceeds to step S6. Thus, new color information RG[X, Y] and BG[X, Y], luminance information L[X, Y], and defocus amount D[X, Y] corresponding to the light measurement range (forty-eight regions) are thereby obtained. Here, X=1 to 8 and Y=1 to 6.

In step S6, the body side microcomputer 21 obtains a coordinate [HX, HY] at which the difference of the stored information (light measurement information, defocus amount) of the template and the calculation information (light measurement information, defocus amount) related to an evaluation area is the smallest while shifting the evaluation area (nine regions to be compared with the template) in the light measurement range (forty-eight regions).

The body side microcomputer 21 calculates the sum Diff [HX, HY] of the absolute values of the differences of each information from the following equation, and obtains the HX, HY at which a minimum value is obtained,

[Equation 1]
where Krg, Kbg, Kl, and Kd are predetermined coefficients.

In step S7 of FIG. 4, the body side microcomputer 21 proceeds to step S8 with the region indicating the coordinate [$HX_{min}$, $HY_{min}$] at which the minimum value of Diff[HX, HY] is obtained as the tracking region. In step S8, the lens driving amount calculation unit 36 of the body side microcomputer 21 determines the forward/backward movement amount and the movement direction of the focus adjustment optical system based on the defocus amount calculated for the region of X=$HX_{min}$, Y=$HY_{min}$, and transmits the necessary data to the lens side microcomputer 6. The focus adjustment optical system of the interchangeable lens 20 is thereby driven.

In step S9, the body side microcomputer 21 updates the stored information of the template to the information on the tracking region, and proceeds to step S10. The middle of the nine regions stored in the storage unit 38 as the template in this case corresponds to the tracking subject region, and corresponds to the region of X=4, Y=2 of the light measurement range of FIG. 3 etc. in the example of FIG. 5. The storage unit 38 updates and stores the information on the range of X=3 to 5, Y=1 to 3 having the region of X=4, Y=2 as the center as the template. The stored information is color information TRG[TX, TY] and TBG[TX, TY], luminance information TL[TX, TY] and defocus amount TD[TX, TY], where TX=1 to 3, TY=1 to 3.

In step S10, the body side microcomputer 21 determines whether or not the half-push ON signal is input. The body side microcomputer 21 determines as positive in step S10 if the half-push operation signal is input from the release switch (not shown) (during half-push) and returns to step S5, and determines as negative in step S10 if the half-push operation signal is not input. When returning to step S5, the processes in step S5 to step S9 are repeated, and thus the defocus amount is sequentially calculated with the moving main subject as the target. The body side microcomputer 21 determining step S10 as negative starts the photograph control if the full-push operation signal is input, and waits until the half-push ON signal is again input if the full-push operation signal is not input.

The embodiment described above has the following effects.

(1) The tracking device of the present embodiment obtains the tracking subject region (existence position of the main subject) in view of not only the light measurement information targeting on the main subject but also in view of the defocus amount corresponding to the light measurement information. Therefore, the tracking device of the present embodiment does not have the tracking target if the defocus amount is substantially equal, as opposed to the conventional tracking device of obtaining the tracking region based only on the light measurement information for the main subject. Thus, the tracking device of the present embodiment prevents background (or foreground) from which the light measurement information substantially equal to the main subject is obtained from being mistakenly set as the tracking target although the defocus amount is different.

(2) The light measurement unit 17 acquires the light measurement information at a plurality of positions (regions) on the light measurement image sensor. The focus detection unit 22 acquires the focus detection information at a plurality of positions (regions) on the defocus amount detection image sensor corresponding to the light measurement information acquiring position. Thus, the tracking device of the present embodiment acquires the light measurement information and the focus detection information for the main subject itself by matching the positions at which both sensor acquire the information. Accordingly, the tracking device of the present embodiment prevents tracking error of acquiring the focus detection information targeting on the background (or foreground) different from the main subject arising from the difference in the information acquiring position of the sensors.

(3) The storage unit 38 of the body side microcomputer 21 stores the light measurement information and the focus detection information acquired for the main subject (step S1 to step S3) as the template (step S4). The body side microcomputer 21 obtains information of the highest matching degree (small difference Diff[HX, HY]) from the newly acquired (step S5) light measurement information and the focus detection information (step S6), and determines the position at which the relevant information is acquired (step S7). Therefore, the tracking device of the present embodiment can obtain the tracking region with a simple template matching calculation even if the position at which the main subject is light measured is moved within the light measurement range.

(4) The tracking device of the present embodiment updates and stores the light measurement information and the focus detection information of the position determined as the tracking region as the template (step S9), and repeats step S5 to step S9 while the half-push operation is being continued, and thus the moving main subject can be reliably tracked.

(Variant 1)

Figure 6:
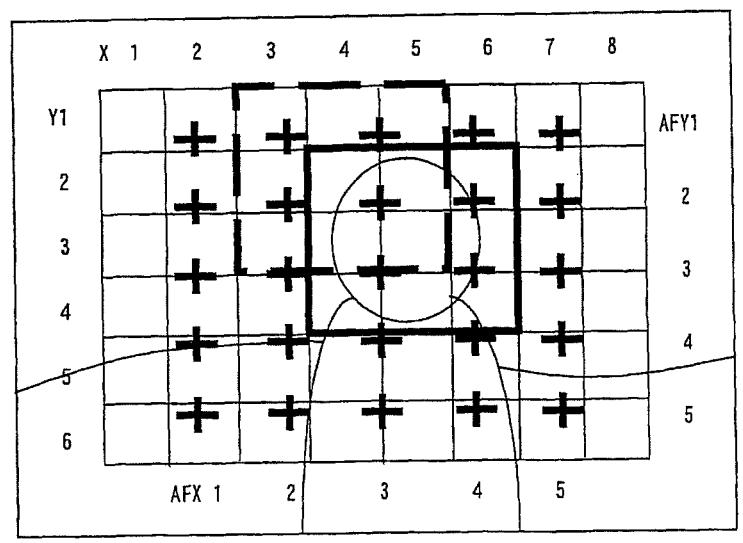
FIG. 6 is a view showing a light measurement range of the light measurement image sensor according to variant 1 of the first embodiment.

In the first embodiment described above, an example of matching the divided region used in the defocus amount detection with the divided region of the light measurement image sensor (light measurement unit 17) has been described, but the following is performed if the divided regions do not match. FIG. 6 is a view showing a light measurement range of the light measurement image sensor (light measurement unit 17) in variant 1.

In FIG. 6, the aspect of dividing the light measurement range into a total of forty-eight regions of eight blocks in the horizontal direction (X direction) and six blocks in the vertical direction (Y direction) is the same as the above-described embodiment. The detection range of the photoelectric conversion signal used in the defocus amount calculation (i.e., detection range of the focus detection information) corresponds to the range in which the cross lines are lined shown in FIG. 6, and has a total of twenty-five detection positions of five blocks in the horizontal direction (AFX direction) and the vertical direction (AFY direction). AFX=1 to 5, and AFY=1 to 5.

The body side microcomputer 21 of variant 1 corresponds the light measurement position and the focus detection position in the following manner when storing the template in step S3. For instance, the focus detection position corresponding to the light measurement position of X=4, Y=2 of the light measurement range of FIG. 6 is AFX=3, AFY=2 adjacent to the relevant light measurement position. The body side microcomputer 21 represents the defocus amount calculated using the photoelectric conversion signal obtained at the detection position of AFX=3, AFY=2 as D[4, 2].

The focus detection position corresponding to the light measurement position of X=4, Y=3 of the light measurement range of FIG. 6 is AFX=3, AFY=3 adjacent to the light measurement position. The body side microcomputer 21 represents the defocus amount calculated using the photoelectric conversion signal obtained at the detection position of AFX=3, AFY=3 as D[4, 3].

Furthermore, the focus detection position corresponding to the light measurement position of X=1, Y=1 of the light measurement range of FIG. 6 is AFX=1, AFY=1 closest to the light measurement position. The body side microcomputer 21 represents the defocus amount calculated using the photoelectric conversion signal obtained at the detection position of AFX=1, AFY=1 as D[1, 1].

According to variant 1 described above, if the light measurement position and the focus detection position are not directly corresponded, the defocus amount is detected based on the photoelectric conversion signal obtained at the focus detection position in the vicinity of the light measurement position, and thus the occurrence of tracking error of acquiring the focus detection information targeting on the background (or foreground) different from the main subject due to difference in the information acquiring position of the sensors although the light measurement information is obtained targeting on the main subject is suppressed.

(Variant 2)

When calculating the sum Diff[HX, HY] of the absolute values of the differences in step S6, the body side microcomputer 21 may correct the defocus amount TD[TX, TY] in the calculation formula using the amount (movement distance) the focus adjustment optical system is driven. The following equation (5) is a calculation formula of the sum Diff[HX, HY] of the absolute values of the differences in variant 2,

[Equation 2]

where Krg, Kbg, Kl, and Kd are predetermined coefficients, and Hk is a correction term involved in the movement distance of the focus adjustment optical system.

The signal indicating the movement distance is detected by a range ring position detection encoder (not shown) of the distance detection unit 4, and transmitted to the body side microcomputer 21 via the lens side microcomputer 6. The body side microcomputer 21 calculates the movement distance of the focus adjustment optical system based on the detection signal from the distance detection unit 4, and multiplies a predetermined focusing position change coefficient Kk to the movement distance to calculate the correction term Hk (Hk=Kk×(movement distance)).

Figure 7:
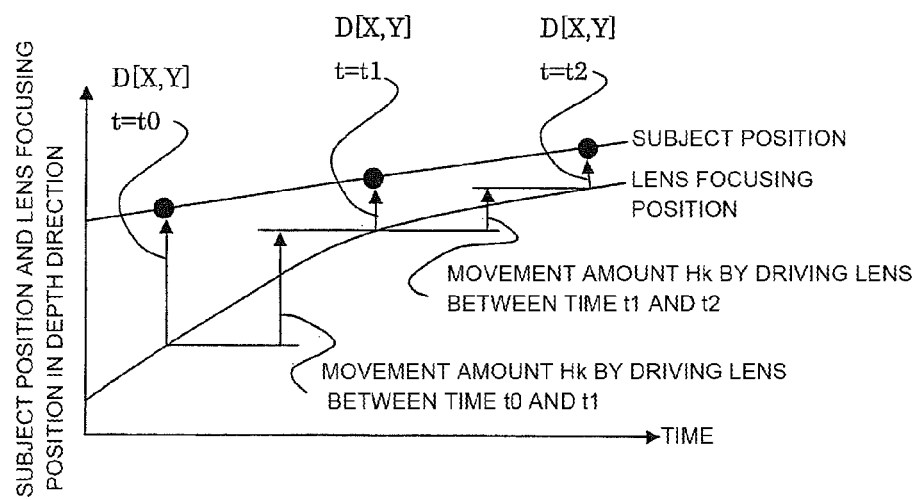
FIG. 7 is a view describing a movement example of a focusing plane by a photographing lens in a case where the focus adjustment optical system is driven temporally continuously according to variant 2 of the first embodiment.

FIG. 7 is a view describing a movement example of an focusing plane by the photographing lens 1 in a case of driving the focus adjustment optical system continuously in terms of time. In FIG. 7, the horizontal axis represents time, and the vertical axis represents the depth in the optical axis direction. The upper line is the subject position (focusing plane of the main subject) and the lower line is the position of the focusing plane by the photographing lens 1. The body side microcomputer 21 calculates the defocus amount D[X, Y] at each time point of time t0, t1, and t2, and moves the focus adjustment optical system by the movement amount corresponding to the defocus amount.

According to the configuration of variant 2, adverse affect on the calculation of the sum Diff[HX, HY] of the absolute values of the differences due to movement of the focus adjustment optical system when the movement amount (movement distance) of the focus adjustment optical system is large is prevented.

(Variant 3)

When calculating the sum Diff[HX, HY] of the absolute values of the differences in variant 2, the body side microcomputer 21 may predict the subject position further correct the defocus amount TD[TX, TY] in the calculation formula using the prediction result. The following equation (6) is a calculation formula of the sum Diff[HX, HY] of the absolute values of the differences in variant 3,

[Equation 3]

where Krg, Kbg, Kl, and Kd are predetermined coefficients, Hk is a correction term involved in the movement distance of the focus adjustment optical system, and Hy is a correction term involved in the subject predicted position.

Figure 8:
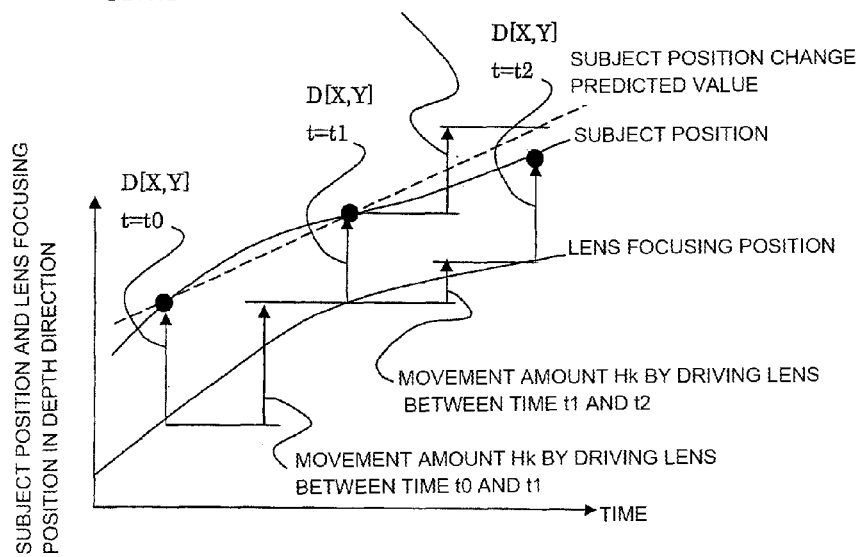
FIG. 8 is a view describing a movement example of a focusing plane by a photographing lens in a case where the focus adjustment optical system is driven temporally continuously and a predicted position of the main subject according to variant 3 of the first embodiment.

FIG. 8 is a view describing a movement example of a focusing plane by the photographing lens 1 in a case of driving the focus adjustment optical system continuously in terms of time, and the predicted position of the main subject. In FIG. 8, the horizontal axis represents time, and the vertical axis represents the depth in the optical axis direction. The upper line is the subject position (focusing plane of the main subject), the dotted line is the predicted position of the subject (predicted focusing plane of the main subject predicted by linear approximation), and the lower line is the position of the focusing plane by the photographing lens 1. The body side microcomputer 21 calculates the defocus amount D[X, Y] at each time point of time t0, t1, and t2, and moves the focus adjustment optical system by the movement amount corresponding to the defocus amount.

According to the configuration of variant 3, adverse affect on the calculation of the sum Diff[HX, HY] of the absolute values of the differences due to movement of the main subject when the movement amount in the depth direction of the main subject is large is prevented.

The above description is merely an example, and is not limited to the configuration of the above-described embodiment.

The automatic focusing device of the single-lens reflex electronic camera has been described by way of example, but the automatic focusing device may be mounted on the single-lens reflex silver salt camera. The tracking device for performing the tracking process according to the present invention is not limited to being mounted on cameras and may be mounted on a telescope and the like. In this case, the subject field corresponds to the field, and the subject corresponds to the object.

It may also be mounted on a camera for realizing, as a light measurement unit, the light measurement function by light measurement outputting a value obtained by averaging each color output of the imaging sensor image for every divided region.

Second Embodiment

The second embodiment will be described with reference to the drawings. The single-lens reflex electronic camera of the second embodiment has substantially the same configuration as the single-lens reflex electronic camera of the first embodiment other than that the subject tracking process and the setting of the focus detection position are different, and thus same reference numerals are denoted for the same configuring positions, and the description will be omitted.

Figure 9A:
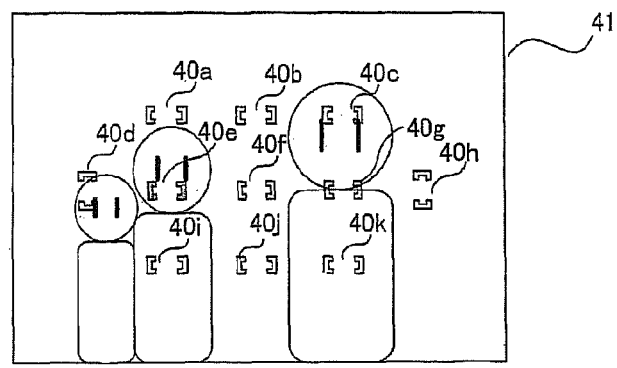
FIGS. 9A to 9C are views conceptually describing various regions used in a subject tracking control of a second embodiment.
Figure 9B:
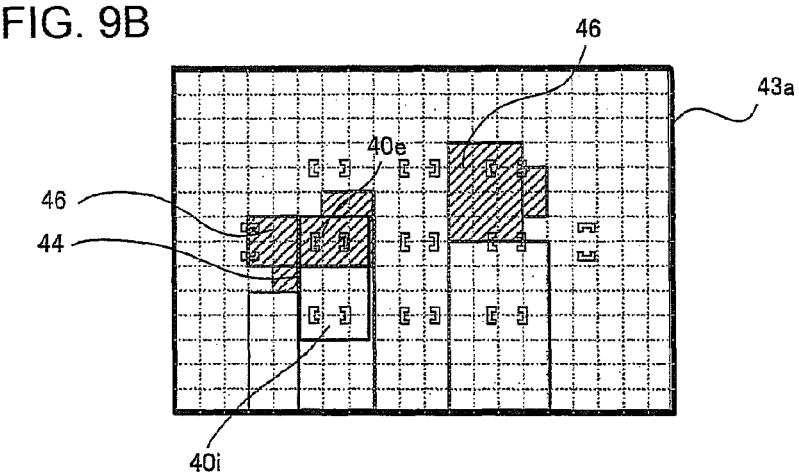
Figure 9C:
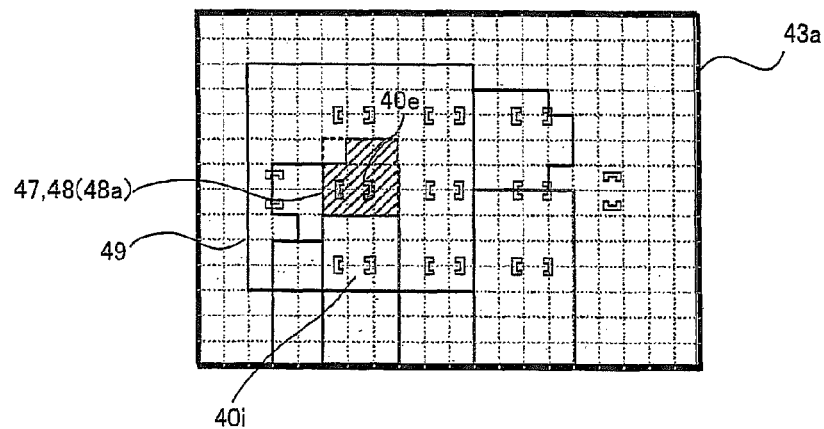

FIGS. 9A to 9C are views conceptually describing various regions used in the subject tracking control of the present embodiment. As shown in FIG. 9A, in the camera of the present embodiment, eleven focus detection regions 40a to 40k, for example, are set within a screen 41 such as a finder field. When one of the eleven focus detection regions 40a to 40k such as the focus detection region 40e of FIG. 9A is selected by the area selection operation unit 351, the focus detection calculation unit 35 calculates the focus detection information (defocus amount) on the selected focus detection region 40e. The area selection operation unit 351 outputs a selected region signal indicating which focus detection region of the eleven focus detection regions 40a to 40k is selected to the tracking control unit 33. The defocus amount calculated in the focus detection calculation unit 35 is output to the lens driving amount calculation unit 36. The lens driving amount calculation unit 36 calculates the lens driving amount based on the input defocus amount, and transmits the lens drive signal to the lens side microcomputer 6. The lens side microcomputer 6 moves the focus adjustment optical system in the optical axis direction by the lens drive unit 3 according to the lens drive signal, and performs focus adjustment. The focus detection calculation unit 35 calculates the defocus amount of all the focus detection regions 40a to 40k, detects a focus detection region 40i in the vicinity of the focus detection region 40e and which difference with the defocus amount of the selected focus detection region 40e is within a predetermined value, and outputs a vicinity region signal indicating the detected focus detection region to the track control unit 33.

The tracking control unit 33 extracts the image data of the range including the pixels corresponding to the focus detection regions 40e, 40i as the defocus amount range 44, as shown in FIG. 9B, based on the input selected region signal and the vicinity region signal. The tracking control unit 33 extracts a collection of pixels of high correlation with hue corresponding to the position of the focus detection region 40e as a same hue region 46 (shaded portion) on an initial image 43a acquired by the light measurement image sensor of the light measurement unit 17. The tracking control unit 33 sets a predetermined range including in which the defocus amount range 44 and the hue region 46 as a tracking subject region 47, and assumes the image in the tracking subject region 47 as a template image 48 that acts as a reference in tracking. The tracking control unit 33 sets a range enlarged by three pixels upward, downward, to the left, and the to the right with the tracking subject region 47 as the center as a tracking search region 49.

The tracking control unit 33 creates a cutout region of the same size as the template image 48 within the region of the tracking search region 49 in the image acquired in time series in the light measurement image sensor of the light measurement unit 17. The tracking control unit 33 calculates the difference between each color of R (red), G (green), and B (blue) of the cutout region, and each color of R (red), G (green), and B (blue) of the template image 48, and performs subject tracking by such difference.

The subject tracking method will be described in detail using FIGS. 9 and 10. FIGS. 10A to 10E are views describing a tracking method according to the present embodiment. In the following description, the photographer operates the selection operation unit 351 and selects the focus detection region 40e shown in FIG. 9A. The focus detection calculation unit 35 then outputs the vicinity region signal to the tracking control unit 33. The vicinity region signal is a signal indicating the position of the focus detection region in the vicinity of the focus detection region 40e and which defocus amount is substantially the same as the focus detection region 40e. In the case of FIG. 9A, the region indicated by the vicinity region signal is a focus detection region 40i.

The tracking control unit 33 sets an image region corresponding to the focus detection regions 40e and 40u as the defocus amount range 44 based on the selected region signal and the vicinity region signal, as shown in FIG. 9B. The tracking control unit 33 also sets the hue, that is, R/G and B/G of the image region corresponding to the focus detection region 40e as a subject hue value, and stores the same in the storage unit 38. The tracking control unit 33 then detects the same hue region having substantially the same hue as the subject hue value in the entire photographed image. The tracking control unit 33 sets a predetermined range including a portion where the defocus amount range 44 and the same hue region 46 overlap such as 3×3 pixels as the tracking subject region 47, as shown in FIG. 9C. The image in the tracking subject region 47 is stored in the storage unit 38 as a template image 48a. Furthermore, the tracking control unit 33 newly sets a subject search region 49 in a range enlarged by three pixels upward, downward, to the left, and to the right to the outer side of the tracking subject region 47.

FIG. 10A is a view showing a next image 43b acquired in time series from the light measurement image sensor of the light measurement unit 17 following the initial image 43a. The tracking control unit 33 detects pixels (shaded portion of FIG. 10A) having the hue in which the difference with the subject hue value stored in the storage unit 38 is within a predetermined range within the range of the subject search region 49, and outputs a signal representing the focus detection region corresponding to the position of the detected pixels to the focus detection calculation unit 35. The focus detection calculation unit 35 performs calculation of defocus amount on the input focus detection region, that is, focus detection regions 40a, 40d, and 40e in FIG. 10A. The focus detection calculation unit 35 determines whether or not the difference of the defocus amount of the focus detection regions 40a, 40d, 40e is smaller than or equal to a predetermined value, that is, whether or not the target to be captured by the three focus detection regions is the same based on the calculation result. In FIG. 10A, the target to be captured by the focus detection regions 40a and 40e is the same target. The focus detection calculation unit 35 also determines whether the tracking target is moving closer or moving away in the optical axis direction with respect to the camera main body 10 based on change in the defocus amount of the focus detection region 40e in the initial image 43a and the next image 43b, and outputs the determination result to the tracking control unit 33.

The tracking control unit 33 determines whether or not there is change in the size on the image of the tracking image on the image based on the input determination result. For example, when determined that the tracking target is moving closer to the camera based on the defocus amount in the focus detection regions 40a and 40e, the tracking control unit 33 enlarges the size of the template image of the tracking target. When determined that the tracking target is moving away from the camera, the tracking control unit 33 reduces the size of the template image of the tracking target. When determined that the tracking target is neither moving closer nor moving away from the camera, the tracking control unit 33 does not change the size of the template image of the tracking image. If the tracking target is enlarged or reduced, the tracking control unit 33 linearly interpolates the template image 48a stored in the storage unit 38, for example, the RGB value of each pixel, creates a template image 48b including the focus detection regions 40a and 40e having the same defocus amount and being enlarged or reduced so as not to overlap the other focus detection region, and stores the same in the storage unit 38.

In the next image 43b shown in FIG. 10A, if determined that the target is moving closer, the template image 48a of 3×3 pixels is enlarged to the template image 48b of 4×4 pixels as shown in FIGS. 10B and 10C. If there is not change in the tracking target, the tracking control unit 33 does not change the size of the template image 48a.

After the template image is decided, the tracking control unit 33 sets the pixel (shaded part of FIG. 10A) having the hue substantially the same as the subject hue value as a tracking search pixel group 50. The tracking control unit 33 calculates the difference of R, G, and B of each pixel between each cutout region of 4×4 pixel of the same size as the template image 48b having the respective pixel shown in the shaded part of FIG. 10A as the center, and the template image 48b. As a result of the calculation, the cutout region having the smallest difference is set as the new tracking subject region 47b of 4×4 pixels, as shown in FIG. 10D.

The tracking control unit 33 outputs the coordinate of the central position of the tracking subject region 47b to the focus detection calculation unit 35. The focus detection calculation unit 35 assumes the focus detection region 40e closest to the center of the tracking subject region 47b as the focus detection region that captures the tracking target as shown in FIG. 10E based on the coordinate of the input tracking subject region 47b, and calculates the focus detection information using the focus detection signal output from a pair of CCD line sensors of the focus detection unit 22 corresponding to the focus detection region 22. The focus detection calculation unit 35 outputs a selected region signal indicating the focus detection region 40e to the light on/off control unit 35 through the tracking control unit 33. The display unit 371 lights the AF area mark of the focus detection region 40e.

If a plurality of focus detection regions 40 is positioned at equal distance from the center of the tracking subject region 47b, the focus detection calculation unit 35 selects the focus detection region position in the movement direction of the subject in a time-series images acquired before, that is, in the direction the movement of the subject is predicted based on the movement history.

After the new tracking subject 47b is set as above, the tracking control unit 33 updates the template image 48. If the template image 48 is enlarged or reduced according to change in size of the target image, the tracking control unit 33 combines the color information of each color of R, G, and B in the size changed template image 48b, and the color information of each color of R, G, and B in the tracking subject region 47b. The tracking control unit 33 stores the updated template image in the storage unit 38. If the size of the template image 48 is not changed, the tracking control unit 33 combines the color information of each color of R, G, and B in the template image 48a, and the color information of each color of R, G, and B in the new tracking subject region 47b. The tracking control unit 33 stores the updated template image 48 in the storage unit 38.

Each process of the subject tracking control operation will be described using the flowchart shown in FIG. 11. FIG. 11 is a flowchart describing the operation of the subject tracking process in the present embodiment. Each process shown in the flowchart is carried out by executing the program in the body side microcomputer 21. The operation of the subject tracking process of the flowchart is started by half-push operating the release switch (not shown).

In step S1, the lens side microcomputer 6 drives the focus adjustment optical system and performs focus adjustment based on the focus detection calculation result calculated in the focus detection calculation unit 35 with respect to the focus detection region set by the photographer, and proceeds to step S2. In step S2, the tracking control unit 33 acquires the image from the light measurement image sensor of the light measurement unit 17 and proceeds to step S3.

In step S3, the focus detection calculation unit 35 calculates the defocus amount on each focus detection region 40a to 40k and proceeds to step S4. In step S4, the focus detection calculation unit 35 determines the defocus amount range 44 based on the calculation result of the defocus amount in step S3, and proceeds the step S5. In step S5, the tracking control unit 33 sets the hue of the image corresponding to the selected focus detection region 40 as the subject hue value, stores the subject hue value in the storage unit 38, and proceeds to step S6.

In step S6, the tracking control unit 33 detects the same hue region 47 having substantially the same hue as the stored subject hue value in the initial image, and proceeds to step S7. In step S7, the track control unit 33 sets the tracking subject region 47 based on the defocus amount range 44 and the same hue region 46, and proceeds to step S8. In step S8, the track control unit 33 stores the image in the tracking subject region 47 set in step S7 in the storage unit 38 as the template image 48, and proceeds to step S9.

In step S9, the track control unit 33 sets the subject search region 49 as described above based on the tracking subject region 47 set in step S7, and proceeds to step S10. In step S10, the body side microcomputer 21 determines whether or not the release switch (not shown) is fully pushed by the photographer. If step S10 is positive, that is, if determined that the release switch is fully pushed in step S10, the process proceeds to step S16. If step S10 is negative, that is, if determined that the release switch is not fully pushed in step S10, the process proceeds to step S11.

In step S11, the tracking control unit 33 acquires the next image (new image) from the light measurement image sensor of the light measurement unit 17, and proceeds to step S12. In step S12, the tracking control unit 33 updates the template image 48 and determines the pixel for searching the tracking target in the update sub-routine to be hereinafter described. After each process in the sub-routine, the process proceeds to step S13. In step S13, the track control unit 33 calculates the difference with the template image 48 (48a or 48b in the example of FIG. 10B or 10C) for each cutout region having each pixel of the subject search pixel group 50 as the center, and proceeds to step S14.

In step S14, the tracking control unit 33 determines the cutout region having the minimum difference value as the new tracking subject region 47b based on the calculation result in step S13, and proceeds to step S15. In step S15, the tracking control unit 33 updates the template image 48 to a new template image 48, stores the same in the storage unit 38, and proceeds to step S16. In step S16, the tracking control unit 33 outputs a selection region signal indicating the focus detection region closest to the middle of the tracking subject region 47b specified in step S14 to the focus detection calculation unit 35, the focus detection calculation unit 35 calculates the defocus amount on such focus detection region, and the light on/off control unit 37 lights the AF area mark corresponding to such focus detection region and returns to step S10. the body side microcomputer 21 proceeds to step S17 when determined that the release switch is fully pushed in step S10, and performs the photographing operation and terminates the series of processes.

Figure 12:
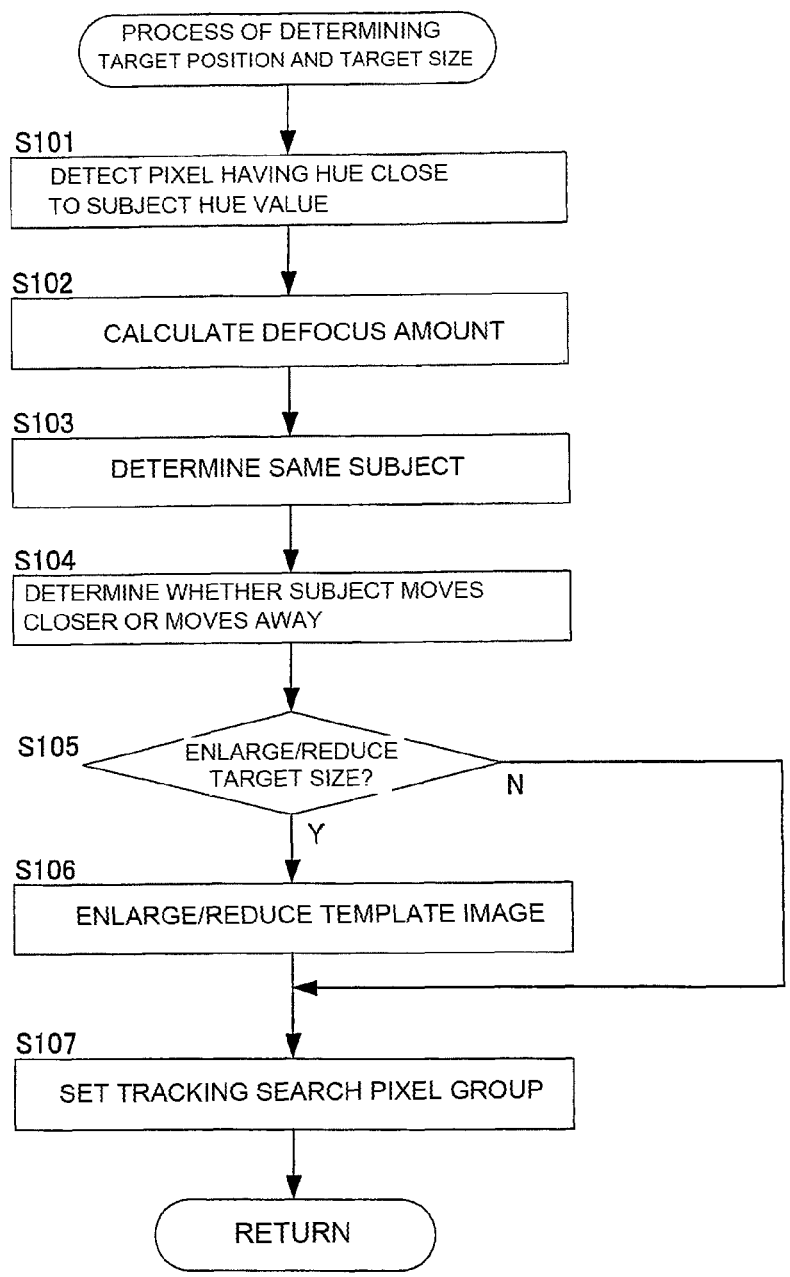
FIG. 12 is a flowchart describing a sub-routine for determining the position and the size of the tracking target in the subject tracking process of the second embodiment.

The update sub-routine in step S12 of FIG. 11 will be described using the flowchart shown in FIG. 12. FIG. 12 is a flowchart describing the sub-routine for determining the position and the size of the tracking target in the subject tracking process of the present embodiment.

In step S101, the tracking control unit 33 detects the pixel having hue close to the hue value of the subject in the subject search region 49, and proceeds to step S102. In step S102, the tracking control unit 33 outputs a signal indicating the focus detection region corresponding to the pixel position detected in step S101 to the focus detection calculation unit 35, and the focus detection calculation unit 35 calculates the defocus amount on the relevant focus detection region and proceeds to step S103.

In step S103, the tracking control unit 33 determines whether, even if the focus detection region corresponding to the pixel having hue close to the hue value of the subject is in plurals, such focus detection regions capture the same subject based on the calculation result in step S102, and proceeds to step S104. In step S104, the tracking control unit 33 determines whether or not the tracking target is moving closer to or moving away with respect to the optical axis direction of the camera body 10 based on the calculation result in step S102, and proceeds to step S105.

In step S105, the tracking control unit 33 determines whether or not the change in size of the template image 48 is necessary based on the determination results in step S103 and step S104. If the size of the template image 48 needs to be changed, the determination in step S105 is positive, and the process proceeds to step S06. If the size of the template image 48 us not necessary, the determination in step S105 is negative, and the process skips step S106 and proceeds to step S107.

In step S106, the tracking control unit 33 enlarges or reduces the template image 48 through the method described above, and proceeds to step S107. In step S107, the tracking control unit 33 sets the pixel having hue close to the subject hue value detected in step S101 as the tracking search pixel group 50. After the setting in step S107 is terminated, the process returns to the main routine from the update sub-routine.

The single-lens reflex electronic camera according to the second embodiment described above has the following advantages.

(1) The single-lens reflex electronic camera of the present embodiment sets the reference information obtained from the range of pixels including the tracking target, that is, the template image 48 and tracks the tracking target based on the color information (light measurement information) acquired by the light measurement image sensor of the light measurement unit 17 and the focus detection information detected in the focus detection calculation unit 35. Therefore, the single-lens reflex electronic camera of the present embodiment can set the template image 48 excluding the influence by background information different from the tracking target, whereby the tracking accuracy enhances.

(2) The single-lens reflex electronic camera of the present embodiment updates the size of the template image 48 according to change in the focus detection information on the tracking target. That is, the single-lens reflex electronic camera of the present embodiment changes the template image 48 by enlarging the template image 48 when determined that the tracking target is moving closer to the camera body 10, and reducing the template image 48 when determined that it is moving away. Therefore, the single-lens reflex electronic camera of the present embodiment can change the size of the template image 48 according to the size of the tracking target that changes on the screen depending on whether the tracking target is moving closer to or moving away from the camera, and thus the influence of the background information can be eliminated, and the tracking accuracy can be enhanced.

(3) The single-lens reflex electronic camera of the present embodiment sets the tracking subject region 47 based on the same hue region 46 and the same defocus amount range 44 on the image acquired by the light measurement image sensor of the light measurement unit 17. The same hue region 46 is a region containing hue highly correlated with the hue in a predetermined range corresponding to the selected focus detection region, and the defocus amount range 44 is a region including the focus detection region having substantially the same defocus amount as the defocus amount of the selected focus detection region. That is, the single-lens reflex electronic camera of the present embodiment selects the subject that becomes the candidate of the tracking target based on the hue value, and determines the tracking target based on the focus detection information from the candidates of the selected tracking target. Therefore, the single-lens reflex electronic camera of the present embodiment can perform the tracking calculation without being influenced by the background information different from the tracking target, and thus the reliability of the tracking calculation can be maintained.

The second embodiment described above may be modified as below.

(1) The single-lens reflex electronic camera of the present embodiment determines the subject hue value, the same hue region 46, and the like that become the reference in setting the template image 48 based on the hue of the tracking target acquired by the light measurement image sensor of the light measurement unit 17, but luminance may be used in place of hue.

(2) The single-lens reflex electronic camera of the present embodiment can set the subject or the tracking target based on a recognition result of the subject and start the above-described tracking process as long as the camera has a function of recognizing the subject, in place of that which specifies the subject or the tracking subject by the operation of the photographer.

(3) The single-lens reflex electronic camera of the present embodiment combines the color information of each color of R, G, and B of the template image 48 and the color information of each color of R, G, and B of the tracking subject region 47b and updates the same as the new template image 48, but the tracking subject region 47b may be replaced as the new template image.

(4) The single-lens reflex electronic camera in which the photographing lens is interchangeable has been described by way of example, but the present invention is not limited thereto, and may be applied to a lens integrated camera or a video camera.

(5) The first embodiment and the second embodiment may be appropriately combined. In particular, the subject tracking process in step S13 selects the candidate of the tracking target based on the hue value, and determines the tracking region based on the focus detection information from the candidates of the selected tracking target, but in this case, Diff[HX, HY] may be calculated as in the first embodiment, and the region indicating the coordinate having the minimum value thereof may be determined as the tracking region.

The present invention is not limited to the above-described embodiments as long as it does not depart from the features of the present invention, and it should be recognized that other modes considered within the scope of the technical idea of the present invention are also encompassed within the scope of the present invention.

What is claimed is:

1. A subject tracking apparatus comprising:
a light detector configured to detect light information based on light from a subject to be tracked at a plurality of light measurement regions in a view of an image, the light information including at least light information detected at a subject region of the subject in the view;
a focus detector configured to detect focus information at a plurality of focus detection regions in the view, the focus information including at least focus information detected at the subject region of the subject in the view; and
a tracking controller configured to:
determine at least one first region having same light information as the light information detected at the subject region from among the plurality of light measurement regions,
determine at least one second region having same focus information as the focus information detected at the subject region from among the plurality of focus detection regions, and
determine reference information for tracking the subject in the view based on the at least one first region and the at least one second region.

2. The subject tracking apparatus according to claim 1, wherein the reference information includes information of a third region that includes the subject region, and
wherein the tracking controller is configured to determine the third region where the at least one first region and the at least one second region overlap.

3. The subject tracking apparatus according to claim 1, wherein
the tracking controller configured to:
determine whether the subject moves closer to or moves away from the subject tracking apparatus based on the focus information of the subject, and
change the reference information depending on the determination of whether the subject moves closer to or moves away from the subject tracking apparatus.

4. The subject tracking apparatus according to claim 3, wherein the reference information includes information of a third region that includes the subject region, and
wherein the tracking controller configured to:
determine the third region where the at least one first region and the at least one second region overlap, and
change the reference region in size depending on the determination of whether the subject moves closer to or moves away from the subject tracking apparatus.

5. The subject tracking apparatus according to claim 1, wherein the reference information includes at least one of color information and luminance information, and
wherein the tracking controller is configured to track the subject based on at least one of the color information and the luminance information.

6. The subject tracking apparatus according to claim 1, wherein the reference information includes a hue value, and
wherein the tracking controller is configured to:
select candidates of the subject based on the hue value, and
select the subject from among the candidates of the subject based on the focus information detected at the plurality of focus detection regions.

7. The subject tracking apparatus according to claim 1, wherein the focus information includes a defocus amount, wherein the light information includes at least one of color information and luminance information, and
wherein the tracking controller is configured to track the subject based on the defocus information and at least one of the color information and the luminance information.

8. The subject tracking apparatus according to claim 1, wherein the light detector comprises an image sensor with a color filter, and
wherein the view of the image corresponds to a view of an image acquired by the image sensor.

9. A camera for picking up an image through an optical system, comprising:
a subject tracking apparatus comprising:
a light detector configured to detect light information based on light from a subject to be tracked at a plurality of light measurement regions in a view of an image, the light information including at least light information detected at a subject region of the subject in the view;

a focus detector configured to detect focus information at a plurality of focus detection regions in the view, the focus information including at least focus information detected at the subject region of the subject in the view; and a tracking controller configured to:
determine at least one first region having same light information as the light information detected at the subject region from among the plurality of light measurement regions,
determine at least one second region having same focus information as the focus information detected at the subject region from among the plurality of focus detection regions,
determine reference information for tracking the subject in the view based on the at least one first region and the at least one second region, and
track the subject in the view based on the reference information.

10. The camera according to claim 9,
wherein the reference information includes information of a third region that includes the subject region, and
wherein the tracking controller is configured to:
determine the third region where the at least one first region and the at least one second region overlap, and
track the subject in the view based on the third region.

11. The camera according to claim 10,
wherein the light detector comprises an image sensor with color filter, and
wherein the view of the image corresponds to a view of an image acquired by the image sensor.

12. The camera according to claim 10, wherein the focus detector is configured to detect a defocus amount at the plurality of focus detection regions by a phase-difference detection method.

13. A method for tracking a subject, comprising:
detecting light information based on light from a subject to be tracked at a plurality of light measurement regions in a view of an image provide by an optical system, the light information including at least light information detected at a subject region of the subject in the view;
detecting focus information at a plurality of focus detection regions in the view, the focus information including at least focus information detected at the subject region of the subject in the view;
determining at least one first region having same light information as the light information detected at the subject region from among the plurality of light measurement regions;
determining at least one second region having same focus information as the focus information of the subject from among the plurality of focus detection regions;
determining reference information for tracking the subject in the view based on the at least one first region and the at least one second region; and
tracking the subject in the view based on the reference information.

14. The method according to claim 13,
wherein the reference information includes information of a third region that includes the subject region, and
wherein the determining the reference information includes determining the subject region of the subject where the at least one first region and the at least one second region overlap.

15. The method according to claim 14,
wherein the detecting the light information includes detecting the light information from an image provided by an image sensor, and
wherein a field of the image corresponds to the field of the image provided by the optical system.

16. The method according to claim 13, further comprising:
determining whether the subject moves closer to or moves away from the optical system based on the focus information of the subject; and
changing the reference information depending on the determination of whether the subject moves closer to or moves away from the optical system,
wherein the tracking the subject in the view includes tracking the subject based on the changed reference information.

17. The method according to claim 16,
wherein the determining the reference information for tracking the subject includes determining the reference information including information of a third region that includes the subject region where the at least one first region and the at least one second region overlap, and
wherein the changing the reference information includes changing the third region in size depending on the determination of whether the subject moves closer to or moves away from the optical system.

18. The method according to claim 13,
wherein the reference information includes a hue value, and
wherein the tracking the subject in the view includes:
selecting candidates of the subject in the view based on the hue value, and
selecting the subject from among the candidates of the subject based on the focus information detected at the plurality of focus detection regions.

19. The method according to claim 13,
wherein the focus information includes a defocus amount,
wherein the light information includes at least one of color information and luminance information, and
wherein the tracking the subject in the view includes tracking the subject based on the defocus information and at least one of the color information and the luminance information.

20. A subject tracking apparatus comprising:
light detection means for detecting light information based on light from a subject to be tracked at a plurality of light measurement regions in a view of an image, the light information including at least light information detected at a subject region of the subject in the view;
focus detection means for detecting focus information at a plurality of focus detection regions in the view, the focus information including at least focus information detected at the subject region; and
tracking control means for
determining at least one first region having same light information as the light information detected at the subject region from among the plurality of light measurement regions,
determining at least one second region having same focus information as the focus information detected at the subject region from among the plurality of focus detection regions,
determining tracking information of the subject for tracking the subject in the field of view based on the at least one first region and the at least one second region, and determining reference information for tracking the subject in the view based on the at least one first region and the at least one second region.

21. A subject tracking apparatus comprising:
an imaging device configured to capture a subject image formed by an optical system and configured to generate image information;
a focus detector configured to detect a focus state of the optical system;
a setting device configured to set a subject region including a tracked subject to be tracked;
a controller configured to detect, from a region of the image information, a first region such that a difference between color information of the first region and color information of the subject region is within a predetermined range, the controller being configured to detect, from the region of the image information, a second region such that a difference between a focus state of the second region and the focus state of the subject region detected by the focus detector is within a predetermined range, the controller being configured to track the tracked subject by using the first region and the second region.

22. The subject tracking apparatus according to claim 21, wherein
the controller is configured to track the tracked subject by using a reference image which is determined based on the first region and the second region.

23. The subject tracking apparatus according to claim 22, wherein
the controller is configured to determine the first region by using pattern matching which is based on an image of the subject region.

24. The subject tracking apparatus according to claim 21, wherein
the controller is configured to determine the second region by using a defocus amount detected by the focus detector.

25. A camera comprising:
the subject tracking apparatus according to claim 21.

* * * * *